United States Patent [19]

Domken

[11] 4,226,607
[45] Oct. 7, 1980

[54] METHOD FOR THE MANUFACTURE OF AMPULES FROM GLASS TUBES

[75] Inventor: Iwan Domken, Thimester-Clermont, Belgium

[73] Assignee: Firma Karl Lutz, Wertheim, Fed. Rep. of Germany

[21] Appl. No.: 960,611

[22] Filed: Nov. 14, 1978

[30] Foreign Application Priority Data

Dec. 24, 1977 [DE] Fed. Rep. of Germany ....... 2757890

[51] Int. Cl.² ........................................... C03B 23/12
[52] U.S. Cl. ..................................... 65/105; 65/109
[58] Field of Search ................ 65/109, 278, 279, 280, 65/102, 105, 112, 174, 268; 82/47, 101, 85, 86; 414/24, 225, 226, 776, 783; 279/35, 23, 123; 134/24

[56] References Cited

U.S. PATENT DOCUMENTS

| | | | |
|---|---|---|---|
| 1,338,941 | 5/1920 | Lindahl | 65/109 X |
| 1,404,206 | 1/1922 | La France | 65/237 X |
| 1,799,019 | 3/1931 | Mischler | 279/123 |
| 2,427,712 | 9/1947 | Casler et al. | 65/278 X |
| 2,757,484 | 8/1956 | Winder | 65/237 |
| 3,227,539 | 1/1966 | Bekkering et al. | 65/109 X |
| 3,243,276 | 3/1966 | Skodzus | 65/276 X |
| 3,265,487 | 8/1966 | Kahlenberg | 65/105 X |
| 3,421,840 | 1/1969 | Pechmann | 134/24 X |
| 4,080,189 | 3/1978 | Dichter | 65/276 |

OTHER PUBLICATIONS

In re Prater and Wei, 86606.1034, pp. 1034, 1043, 1044.

Primary Examiner—Richard V. Fisher
Attorney, Agent, or Firm—Max Fogiel

[57] ABSTRACT

A method for the manufacture of containers from glass tubes, particularly ampules, in which container blanks coming from a production machine are delivered intermittently and successively to processing stations arranged along a conveying route and reshaped and processed therein in successive operations. Each container blank is individually grasped immediately after its delivery from the production machine and is held rotatably about its lengthwise axis during processing in the processing stations. The container blanks may be transferred after being grasped to a position pointing their open ends downward, possibly in a vertical direction. The arrangement may provide for the stepwise conveyance of the container blanks, through clamping devices for holding a container blank on one end, with the blanks moving along the processing stations. These clamping units may be chucks with one or more leaf springs. The clamping units may pivot about axes perpendicular to their rotation axes from a horizontal to a vertical position of the container blanks. The clamping units are guided along a closed track, possibly circular, with the processing stations along the track.

2 Claims, 6 Drawing Figures

METHOD FOR THE MANUFACTURE OF AMPULES FROM GLASS TUBES

BACKGROUND OF THE INVENTION

The production of containers from glass tubing, involving ampules or similar glass products, conssits of two successive manufacturing steps which in turn include several operations.

The first manufacturing step involves the production of container blanks from glass tubing which are drawn, formed and cut directly from glass tubing by a known method and then delivered to the second manufacturing step.

Particularly with the production of ampules, the second manufacturing step includes extensive operations which, depending on the type of ampule, may be widely varying and expensive. The invention deals with this manufacturing step based on container blanks of glass tubing as semifinished products.

In ampule manufacture, it is known in the art how to deliver the container blanks, coming from a production machine, to an intermittently operating conveying device which facilitates further conveyance along a conveying route and hence to successive processing stations along this conveying route. The devices for realizing this second manufacturing step involve outright processing lines which in similar form are known also in other areas of industrial production.

Typical of such processing lines for processing blanks from glass tubing are intake rails having recesses and intermittently movable lifting cams (also chain conveyers and similar means) which with each operation lift a certain number of ampule blanks from the recesses receiving them on the intake rails, move them by one or several indexing steps between adjacent recesses in the conveying direction and the deposit them for further processing. The ampule blanks are thus received loosely lying in the recesses of the intake rails.

It has been found that because of the stepwise delivery of blanks from one such recess in the intake rail to successive recesses, undesirable skid marks may appear on the outer surfaces of the glass products. The appearance of such skid marks is increased by the fact that during various processes the blanks received in the horizontal position must be set in rotation about their lengthwise axes for which purpose at such processing stations friction wheels must act from the outside on the ampule jacket. For example, when separating the ampule head, it is necessary to set the blanks in rotation about their horizontal lengthwise axes.

It is an object of the present invention to improve the known production method by avoiding the previously unavoidable markings and skid marks on the jacket surfaces.

Another object of the present invention is to provide an arrangement of the foregoing character which is substantially simple in construction and may be economically fabricated.

A further object of the present invention is to provide an installation, as described, which may be readily maintained in service and which has a substantially long operating life.

SUMMARY OF THE INVENTION

These objects of the present invention are achieved by individually grasping the container blanks coming from a production machine immediately after their delivery from the production machine and holding them rotatable about their lengthwise axes during processing in the processing stations arranged along the conveying route, rigidly or elastically as required, improving the various processing steps.

With the known production method with loosely lying ampules in the intake recesses of the intake rails it has been a problem to cut off the ampule head of so-called funnel ampules in the conic portion of the ampule tip because this led to an axial displacement of the ampules in the recesses of the intake rails due to the horizontal components of the cutting forces during the cutting process. Previously it was necessary to produce the funnel ampules during the first manufacturing step on a production machine. There arose the problem of maintaining the quality of the ampules between an acceptable thickness of the funnel edge and an acceptable neutral region. It is known to any ampule expert that a funnel edge complying with requirements leads to an inadequate ampule neutrality; vice versa, when achieving the desired neutrality, the funnel edge is unacceptable.

In order to produce a thin-walled funnel, care must be taken when separating the ampule from the glass tubing used in the production machine that there is minimum glass thickness in the head of the ampule blank just formed. But this also leads to minimum glass thickness in the bottom of the next ampule. Consequently, the bottom of the ampule must be heated again in a subsequent operation to thicken it and to arrive at a reasonable wall thickness. This additional heating of the bottom increases the hazard of impairing the neutrality of the next ampule due to high sodium production through overheating.

A perfect quality of the bottoms and funnels at the same time cannot be achieved with the known production methods. While ensuring the required neutrality, there is the danger of a bead-like thickening of the funnel edge and hence the risk that during a rinsing process required before filling and closing the ampule, rinsing agent residues may occur in the region of this bead-like edge, creating the danger of mixing such rinsing agent residues with the latter medication filling. On the other hand, with deficient neutrality of the ampules there is the danger that the latter medication fillings are damaged.

The method in accordance with the present invention makes it possible to produce already during the first production step on an ampule production machine a good neutral ampule, regardless of the quality of the ampule head, because the latter is cut off during the second production step and a perfect smooth funnel can be formed.

Thus the method according to the present invention has solved the problem of the contradictory requirements for a thin-walled funnel and ampule neutrality in a surprisingly simple fashion.

In the processing of container blanks, particularly in cutting operations, there unavoidably occur glass chips and glass dust which with the known production method with horizontal blanks can get inside these blanks. It is known to blow out the containers before finishing by means of a nozzle introduced in the container, but this does not assure safe removal of such impurities. Ampules frequently have in the transition region between the usually cylindrical ampule body and the tip opposite the bottom a radial restriction at which in many ampules a breaking ring is located so that between ampule body and tip a shoulder formed by this radial restriction occurs. Such impurities may accumulate ahead of this shoulder in spite of blow-out.

Through the transfer in accordance with the present invention of the blanks immediately after delivery from a production machine to be grasped and held to a processing position in which the head of the blanks points downward, the danger of dropping and retaining such impurities is considerably reduced or entirely avoided, because at least larger chips fall due to gravity from the containers whose openings point downward and during blowout impurities in the form of glass dust are removed more reliably from the containers than was the case with the previous manufacturing method in the horizontal position.

Further embodiments of the present invention are of great importance in the manufacture of so-called melt-open ampules. These are ampules which are closed at the end of their manufacture by fusing the tip end to close. Such ampules make economic sense only if they can be filled in pharmaceutic enterprises without being cleaned again, with melting the closed tip end open and fusing it closed after filling. Hence it is necessary for the use of these ampules that they need not be cleaned again before filling. Hence the ampule manufacturer must assure a clean and sterile manufacture of such ampules. This was previously impossible. The present invention results in a considerable improvement in ampule manufacture since a previously unattained measure of safety against the remaining of impurities in the ampules is assured.

The present invention also provides for an apparatus for carrying out the method. This apparatus differs from known arrangement for the manufacture of containers made of glass tubes since it has clamping devices for grasping and clamping of a container blank at one of its ends. These clamping devices are rotatably arranged about a rotating axis and movable along the processing stations. It is understood that the rotation axes of these clamping devices, which may be chucks which can be made to clamp automatically, coincide with the lengthwise axis of the container blanks when the latter are received in the clamped position.

One of the embodiments of the present invention provides that the container during cutting or making are held elastically, and hence have a radial play of the container relative to the clamping device if they are pressed against a cutting or marking disk, or the latter is pressed against the containers. The containers may also be held rigidly, with the transition from and to the elastic hold being realized by a slight movement of the jaws.

An embodiment of the present invention provides for the pivoting of these clamping devices, such that the container blanks coming from a production machine are delivered in a known manner with horizontal lengthwise axes and can be grasped and clamped in this position. During the further transport the clamping devices are pivotal around pivot axes substantially right-angled in relation to the rotation axes of the clamping devices so that before reaching certain processing stations they are in the downward operating position where the clamped container blanks point downward with the head or their open ends.

After processing the ampule head the chuck can again be pivoted to the horizontal position to perform all operations requiring this horizontal positions and to remove the ampules from the chucks and to deliver them to a conveyer, for example, a conveyor belt.

One embodiment provides for an expedient arrangement with the clamping device guided along a closed track; this path may be a circular track, but also another system, and the individual process stations are arranged along the conveying route inside or peripheral to this track.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawings.

DESCRIPTION OF THE PREFERRED EMBODIMENTS

Figure 1:
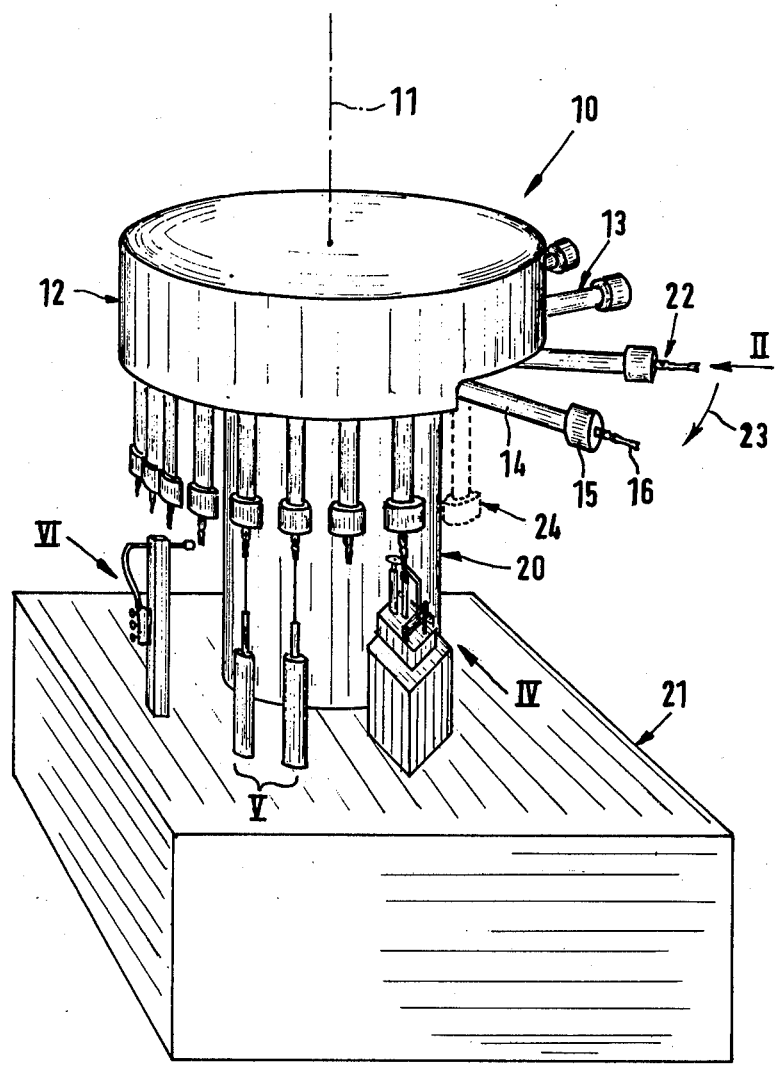
FIG. 1 shows a schematic general perspective view of the arrangement in accordance with the present invention.

The arrangement 10 shown in FIG. 1 includes a drum 12 rotating about a vertical rotary axis 11 with workpiece holders 13 arranged along the drum periphery along a circular track. These workpiece holders consist of spindles 14 rotatable about their lengthwise axis and chucks 15 at the free spindle ends for clamping ampule blanks. In relation to the drum 12, the workpiece holders 13 are fixed and each workpiece holder has a rotary drive acting on its spindle (not shown in the drawing). Also, drum 12 has a rotary drive (not shown). The workpiece holders can be tilted about horizontal pivot axes between an acceptance position with a horizontal location of the spindles and a processing position directed downward where the spindles are vertical with the chucks at their lower ends. The ampule blanks are received in the chucks such that the lengthwise axes of the blanks are aligned with the lengthwise rotary axes of the spindles 14.

The drum equipped with the workpiece holders 13 is held in a stand 20 which extends from a base 21 vertically upwards. Around this stand the base has the various stations for processing the ampule blanks held in the chucks of the workpiece holders along a circular track which coincides with the arrangement of the workpiece holders. This circular track is concentric about the vertical rotary axis 11 of drum 12. The angular distance between the process stations equals the angular distance between adjacent workpiece holders. The drawing shows a schematic of a cutting station denoted by IV, two blowing-out stations denoted by V and a station, denoted by VI, for fusing the open tip ends of the ampules held in the collet chucks 15.

During operation of the arrangement, the ampule blanks, coming from a production machine, are delivered in the horizontal position and received in this horizontal position by a chuck 15 located in the region of a delivery (or intake) station. The delivery station is denoted by 22. After an ampule blank is held in the delivery station 22, the drum 12 rotates by an angle corresponding to the angular distance between the individual processing stations. The direction of rotation 15 is marked by arrow 23. In this position, the workpiece holder loaded with a workpiece 16 in the preceding delivery station 22 undergoes a pivotal movement about a horizontal pivot axis to the vertical position shown by a broken line in FIG. 1 and denoted by 24. The next and each following indexing step of drum 12 in the direction of arrow 23 brings the workpiece holder, pivoted into the vertical position 24 into the range of action of one of the processing stations arranged concentrically around the rotary axis 11.

FIG. 1 shows a cutting station IV, two successive blowout stations V and a station VI for fusing the open tip ends of the ampules.

Figure 2:
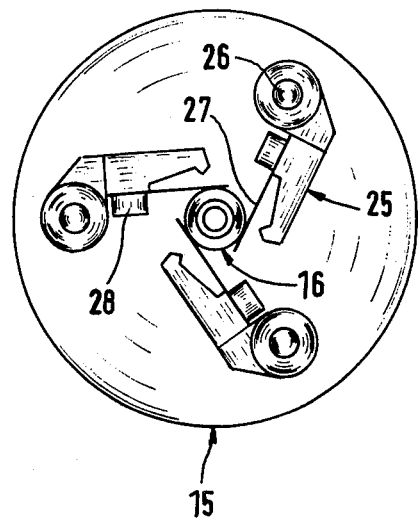
FIG. 2 shows a view of the chuck viewed in the direction of arrow II in FIG. 1 and a spring-held ampule blank just picked up.
Figure 3:
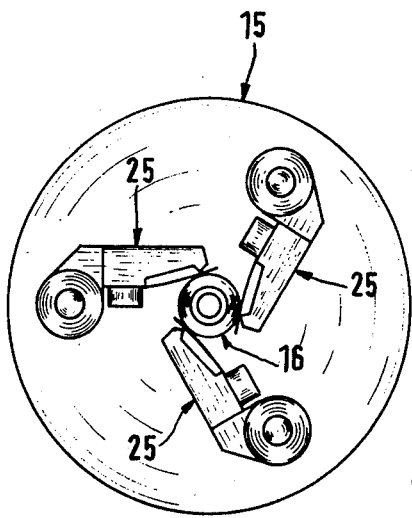
FIG. 3 shows a view similar to FIG. 2, but with a tightly-held ampule blank in the chucked position.

The collet chuck 15 illustrated in FIGS. 2 and 3 is a three-jaw chuck with jaws 25 which are equally spaced apart by identical peripheral angles and can be pivoted about trunnions 26 running parallel to the spindle rotary axis of the workpiece holders. The chucking area of the jaws consists of a leaf spring 27 which is connected with the jaws 25 by means of a screw 28 on the side facing the center of the chuck.

At the delivery station denoted by 22 in FIG. 1, the ampule blanks coming from a producing machine, with their bottoms facing the chucks are delivered to the spindles in the direction of the rotary axis. As soon as the closed ends of the ampule blanks reach the range of action of the chucks 25, the blanks are clamped by the pivoting of these jaws about their trunnions 26. At the cutting station IV it is expedient if the workpieces 16 can slightly move in the jaws in the radial direction. This is made possible by the spring-loaded holding between the leaf springs 27 which are not yet pressed on by the jaws 25, as shown in FIG. 2. FIG. 3 shows the rigid clamping of the ampule blanks. This is achieved by pressing the jaws 25 against the leaf springs 27, cancelling the major portion of their spring action and resulting in secure holding of the ampules for those processes where rigid clamping is required.

In the cutting station IV, the end of the downward-pointing head 18 of an ampule blank 16 is severed from the ampule tip 17. At the cutting station, the lower open end of the ampule tip 17 contacts a stop 30 which is supported, via spring 31 and an intermediate member 32, by a cross traverse 33 whose heights is adjustable. A movable guide rod 34 extends from stop 30 through the intermediate member. The cross traverse 33 also holds a bearing block 35 in which a motor-driven shaft 36 is rotatably mounted. At its upper end extending axially beyond the bearing block 35, the shaft mounts the cut-off disk 38 secured by a screw 37. In order to cut off the head 18, the tip 17 of the ampule is pressed against the cut-off disk 38 by a holder 40 pivoting about a pivot point 41 on the cross traverse 33. This is achieved by vertically shifting a wedge 43 upwards which receives its motion from a cam (not shown) via the guide rod 44. This wedge 43 pushes the pressure roller 42 in the direction of the chuck axis and holder simultaneously pivots about its pivot point 41 and thus pushes the ampule tip against the cut-off disk 38. Through the action of the return spring 46, which is fastened to bearing block 45, the pressure roller 42 remains in contact with wedge 43. During the cutting process, the cut-off disk and the ampules rotate. The cross traverse 33 is held by vertically downward threaded bolts 47 which extend through spindle nuts 48 which are mounted with a fixed axis but rotating in frame 49 of the cutting station. By rotating the spindle nuts, it is possible to vertically adjust the cross traverse and thus the height of the entire cutting device.

Differing from the state of the art, the arrangement in accordance with the present invention performs the entire process with the ampule in the vertical position. It is important that the open tip end points downward. This ensures that glass particles developing during cutting or for other reasons drop downward due to gravity and cannot get into the ampules.

Figure 4:
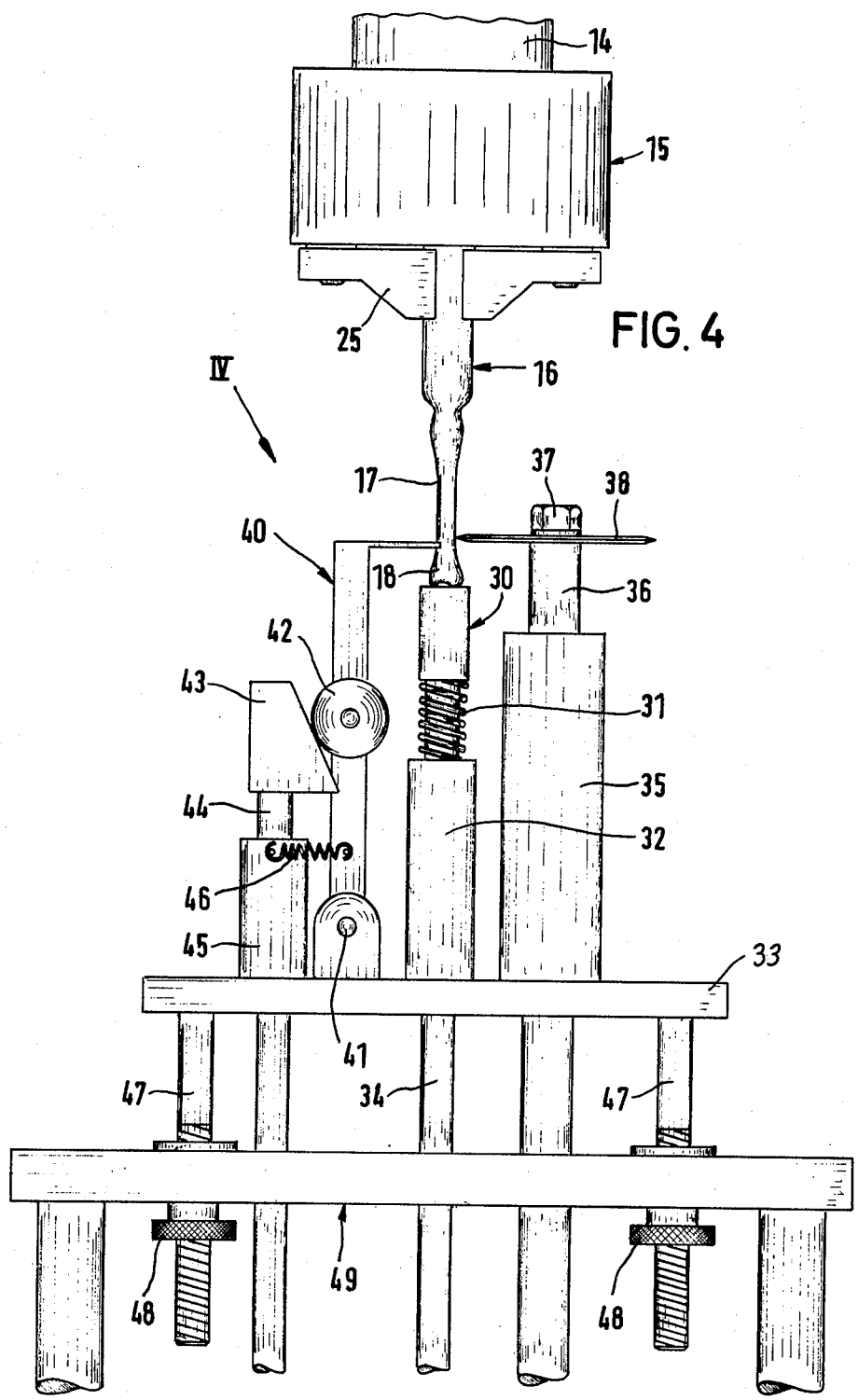
FIG. 4 shows the cutting station denoted by IV in FIG. 1.
Figures 5, 6:
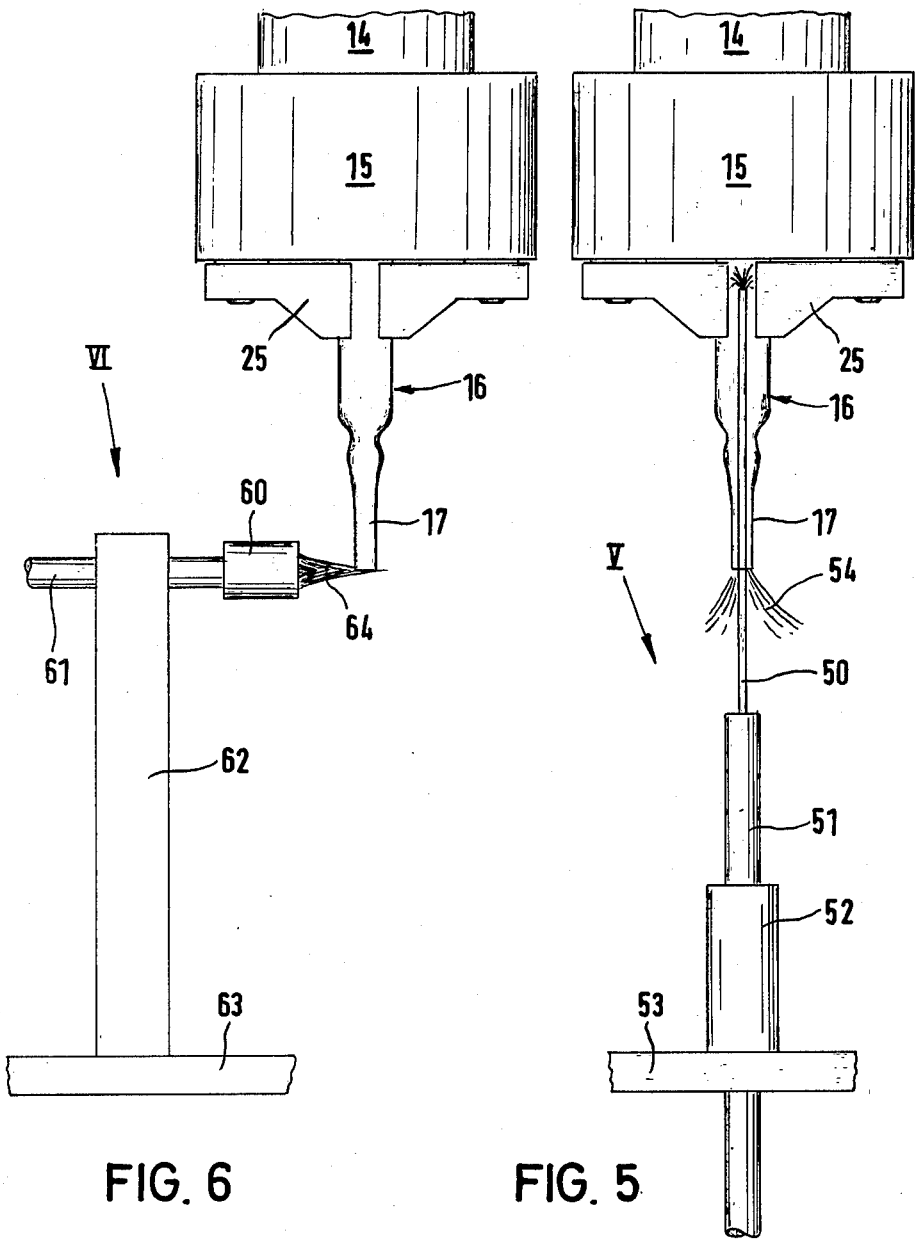
FIG. 5 shows one of the blowout stations denoted by V in FIG. 1.
FIG. 6 shows a station for fusing a downward-pointing ampule tip, denoted by VI in FIG. 1.

FIG. 5 illustrates an ampule blank after cutting off the tip end in a blow-out station V in which possible impurities, having entered the interior of the ampule blank during processing, are blown out. Again the ampule blank 16 is held by the chuck 15, as in FIG. 4, in the vertical position with the tip end pointing downward. The blow-out station includes a blow nozzle in the form of a thin blow tube 50 exceeding the length of the ampules involved. This blow tube extends axially through a vertically moving guide member 51 and is axially fixed thereto. The guide member 51 is held in a bearing block 52 which is arranged on a cross traverse 53, which, like the cross traverse 33 at the cutting station of FIG. 4, can have adjustable height.

As soon as through stepwise indexing an ampule received in a chuck reaches the blow-out station where the ampule lengthwise axis coincides with the axis of rotation of the spindle carrying the chuck 15 and aligned with the lengthwise axis of the vertical guide member 51, the blow tube 50 is inserted via the vertical guide member 51 from below into the ampule close to the ampule bottom and the ampule space is blown out by the medium delivered via the blow tube. FIG. 5 at 54 shows impurities, such as glass dust, leaving via the ampule tip open downwardly.

FIG. 6 shows station VI and the fusing of the cut ampule tip 17. This process involves the manufacture of so-called funnel ampules or cut ampules. The fusing is considerably facilitated because these ampules exhibit no beadlike bulges at the cut-off edge.

This station includes a known burner 60 which is connected to a line 61 for supplying fuel gas. This burner is mounted in a console 62 which in turn is arranged on a traverse 63 which also may have a height adjustment. When fusing the open tip end, the ampule 16 is held in the chuck 15 in the vertical position so that the open tip end points downward and is at the level of flame 64 of burner 60.

It is characteristic for the arrangement for the processing of ampule blanks that these ampule blanks are grasped in the region of the ampule bottom in the horizontal position by the chucks, are pivoted into the vertical position with the ampule tip pointing downward and are held in this position for all processing stations. During the processing, the ampules 16 held by the chucks 15 rotate at a speed in accordance with the requirements. After finishing the ampules, they are passed on from the chucks to other conveying means (not part of the present invention), for example for delivery to a annealing oven and a packaging device.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for the manufacture of ampules from glass tubes, comprising the steps of:

receiving an ampule blank with longitudinal axis horizontally from a blank production machine intermittently and successively, clamping said ampule blank and holding said ampule elastically in vicinity of a closed end thereof;

rotating said ampule blank to a vertical position of said axis, said ampule blank having a downward-pointing head located at the end of an open tip opposite to said closed end of said ampule;

severing said downward-pointing head from said ampule blank while in vertical position of said axis;

removing impurities from the interior of said ampule blank after said severing step by blowing out the internal space of said ampule while in vertical position of said axis; and fusing the severed tip of said ampule while in vertical position of said axis.

2. A method as defined in claim 1 wherein said ampule is substantially movable in radial direction while being clamped for said severing step.

* * * * *